(12) United States Patent
Salsbury et al.

(10) Patent No.: US 8,421,801 B2
(45) Date of Patent: Apr. 16, 2013

(54) RAY TRACING USING RAY-SPECIFIC CLIPPING

(75) Inventors: Ryan R. Salsbury, San Francisco, CA (US); James Alexander McCombe, San Francisco, CA (US); Stephen Purcell, Mountain View, CA (US); Luke Tilman Peterson, Oakland, CA (US)

(73) Assignee: Caustic Graphics, Inc., San Francisco, CA (US)

( * ) Notice: Subject to any disclaimer, the term of this patent is extended or adjusted under 35 U.S.C. 154(b) by 837 days.

(21) Appl. No.: 12/555,678

(22) Filed: Sep. 8, 2009

(65) Prior Publication Data

US 2010/0231589 A1 Sep. 16, 2010

Related U.S. Application Data

(60) Provisional application No. 61/095,570, filed on Sep. 9, 2008, provisional application No. 61/099,152, filed on Sep. 22, 2008, provisional application No. 61/101,854, filed on Oct. 1, 2008, provisional application No. 61/172,453, filed on Apr. 24, 2009.

(51) Int. Cl.
*G06T 15/50* (2011.01)

(52) U.S. Cl.
USPC .......................................... 345/426; 345/419

(58) Field of Classification Search .................. 345/426, 345/419
See application file for complete search history.

(56) References Cited

U.S. PATENT DOCUMENTS

| | | | |
|---|---|---|---|
| 5,933,146 A | 8/1999 | Wrigley | |
| 6,226,005 B1* | 5/2001 | Laferriere | 345/426 |
| 7,012,604 B1 | 3/2006 | Christie et al. | |
| 7,289,118 B2 | 10/2007 | Schmittler et al. | |
| 7,348,975 B2 | 3/2008 | Reshetov et al. | |
| 2004/0249809 A1 | 12/2004 | Ramani et al. | |
| 2006/0098009 A1 | 5/2006 | Zuniga | |
| 2006/0139349 A1* | 6/2006 | Reshetov et al. | 345/426 |

(Continued)

FOREIGN PATENT DOCUMENTS

WO WO 2008/037599 A1 4/2008

OTHER PUBLICATIONS

Benthin "Realtime Ray Tracing on current CPU Architectures", Computer Graphics Group, Jan. 2006, pp. iii, 6, 27, 39, 43, 137.*

(Continued)

*Primary Examiner* — Maurice L McDowell, Jr.
(74) *Attorney, Agent, or Firm* — Michael S. Garrabrants; ArtesynIP, Inc.

(57) ABSTRACT

Systems, methods, and computer readable media embodying such methods provide for allowing specification of per-ray clipping information that defines a sub-portion of a 3-D scene in which the ray should be traced. The clipping information can be specified as a clip distance from a ray origin, as an end value of a parametric ray definition, or alternatively the clipping information can be built into a definition of the ray to be traced. The clipping information can be used to check whether portions of an acceleration structure need to be traversed, as well as whether primitives should be tested for intersection. Other aspects include specifying a default object that can be returned as intersected when no primitive was intersected within the sub-portion defined for testing. Further aspects include allowing provision of flags interpretable by an intersection testing resource that control what the intersection testing resource does, and/or what information it reports after conclusion of testing of a ray.

23 Claims, 6 Drawing Sheets

U.S. PATENT DOCUMENTS

| | | |
|---|---|---|
| 2007/0132754 A1 | 6/2007 | Reshetov et al. |
| 2008/0024489 A1 | 1/2008 | Shearer |
| 2008/0122841 A1 | 5/2008 | Brown et al. |
| 2008/0129734 A1 | 6/2008 | Seung-Woo et al. |
| 2008/0150944 A1 | 6/2008 | Reshetov et al. |

OTHER PUBLICATIONS

Woop, "RPU: A Programmable Ray Processing Unit for Realtime Ray Tracing", ACM Transactions on Graphics, 2005, pp. 6-7.*

Kersten, "Moving Cast Shadows Induce Apparent Motion in Depth" Perception 26, (1997), p. 21.*

P. H. Christensen, J. Fong, D. M. Laur and Dana Batali, "Ray Tracing for the Movie 'Cars'," IEEE Symposium on Interactive Ray Tracing, 2006, pp. 1-6.

Eric Haines, "Ray Tracing News: Light Makes Right" [Online], vol. 2, No. 8, Oct. 27, 1989. Retrieved from the Internet: URL:http://tog.acm.org/resources/RTNews/html/rtnews9a.html> [retrieved on Oct. 26, 2010].

Roni Yagel and John Meeker, "Priority-driven Ray Tracing," The Journal of Visualization and Computer Animation, vol. 8, No. 1, pp. 17-32, Jan. 1, 1997.

Martin Christen, "Ray Tracing on GPU," Master's thesis, Univ. of Applied Sciences Basel (FHBB), Jan. 19, 2005 (Available online at http://gpurt.sourceforge.net/DA07_0405_Ray_Tracing_on GPU-1.0.5.pdf, last visited Dec. 10, 2009).

Andreas Dietrich, Ingo Wald, Carsten Benthin and Philipp Slusallek, "The OpenRT Application Programming Interface—Towards a Common API for Interactive Ray Tracing-" Proceedings of the 2003 OpenSG Symposium (Darmstadt, Germany), Eurographics Association, 2003, pp. 23-31.

Andreas Dietrich, Ingo Wald, Carsten Benthin and Philipp Slusallek, "The OpenRT Application Programming Interface—Towards a Common API for Interactive Ray Tracing-" OpenSG 2003, Darmstadt, Germany (Available online at http://graphics.cs.uni-sb.de/fileadmin/cguds/papers/2003/opensg03/ TheOpenRTAPI_OpenSG2003.ppt, last visited Sep. 21, 2009).

S. Parker, S. Boulos, J. Bigler and A. Robison, "RTSL: a Ray Tracing Shading Language," IEEE Symposium on Interactive Ray Tracing, 2007. RT '07, Sep. 10-12, 2007, pp. 149-160, Ulm.

Johannes Hanika, "Fixed Point Hardware Ray Tracing," Diplomarbeit, Ulm University, Germany, 2007. (Available at http://www.uni-ulm.de/fileadmin/website_uni_ulm/iui.inst.100/institut/mitarbeiter/jo/dreggn2.pdf, last visited on Mar. 31, 2008.).

J. Hanika and A. Keller, "Towards Hardware Ray Tracing using Fixed Point Arithmetic," IEEE/EG Symposium on Interactive Ray Tracing, Sep. 10-12, 2007, Ulm, Germany, pp. 119-128.

E. Groller and W. Purgathofer, "Coherence in Computer Graphics," Institute for Computer Graphics, Technical, University Vienna, Vienna, Austria, In Transactions on Information and Communications Technologies, vol. 5, 1993 WIT Press.

Eric Larsen, Stefan Gottschalk, Ming C. Lin, and Dinesh Manocha, "Fast Distance Queries with Rectangular Swept Sphere Volumes," Proceedings of IEEE International Conference on Robotics and Automation, San Francisco, CA, 2000, vol. 4, pp. 3719-3726.

James Arvo and David Kirk, "Fast Ray Tracing by Ray Classification," ACM Siggraph Computer Graphics 21 (4), Jul. 1987, pp. 55-64.

Masataka Ohta and Mamoru Maekawa, "Ray-bound tracing for perfect and efficient anti-aliasing," The Visual Computer: International Journal of Computer Graphics, vol. 6, issue 3, Springer Berlin / Heidelberg, May 1990, pp. 125-133.

* cited by examiner

RAY TRACING USING RAY-SPECIFIC CLIPPING

CROSS-REFERENCE TO RELATED APPLICATIONS

This application claims priority from U.S. provisional application No. 61/095,570, entitled "Ray Tracing Using Ray-Specific Clipping", and filed on Sep. 9, 2008, and from U.S. provisional application Nos. 61/099,152, 61/101,854, and 61/172,453, filed respectively on Sep. 22, 2008, Oct. 1, 2008, and Apr. 24, 2009, and all entitled "Shader API for Non-Recursive Ray Tracing"; all above-referenced applications are incorporated by reference in their entirety, for all purposes, herein.

BACKGROUND

1. Field

The following generally relates to computer graphics, and more particularly to accelerating rendering of 2-D representations of 3-D scenes using ray tracing.

2. Description of Related Art

Rendering photo-realistic 2-D images from 3-D scene descriptions with ray tracing is well-known in the computer graphics arts.

Ray tracing usually involves obtaining a scene description composed of geometric primitives, such as triangles, that describe surfaces of structures in the scene. The primitives can be associated with textures and other information that instructs a computer how light hitting that primitive should be affected by qualities of the primitive. In other words, a model of a physical environment is produced; the model may be designed to produce realistic results for conditions familiar to humans, or the model may be designed to achieve other results as desired. Ray tracing can produce photo-realistic images, including realistic shadow and lighting effects, because ray tracing can model the physical behavior of light interacting with elements of a scene. However, ray tracing is also known to be computationally intensive, and at present, even a state of the art graphics workstation requires a substantial amount of time to render a complicated scene using ray tracing, and real-time high quality and resolution rendering with ray tracing is still difficult to achieve.

Most practical scenes include sources of light (more generally, can be a model of any sort of energy source, for example, x-rays, infrared light, and the like). The light sources illuminate objects in the scene. Usually, a scene description reaches to a given extent, in that scenes are defined usually within some bounded area that can be identified by a scene boundary, which can also be known as a scene clip distance. Then, rays are emitted from a camera, or from other origins to test any number of conditions (e.g., is a particular point of an object in shadow of another object).

Such rays are traced in the scene until an intersection with a scene object, such as a primitive or a light source, is identified, or the ray has been traced to the scene boundary. Then, if there was an intersection with another primitive, further rays can be emitted for gather information about conditions at that intersection point. If a light source was intersected, then light energy from that light source can be determined to hit the origin of that ray. Various attributes of the light can be considered, such as its color and intensity.

All of the above describes a computer-based model of directed energy propagation through a scene having energy sources, and various objects that can have different qualities, such as different textures, colors, diffraction, and reflection properties, and the like. Thus, whether results obtained from such a model are as desired depends on precision and accuracy of the computation resources used to implement the model, including the hardware and how the hardware is being used by software. Methods and systems that allow either better results from a given amount of precision and accuracy or that allow a desired result with less computation are desirable, and some aspects of the following address such goals, and other improvements in ray-tracing systems.

SUMMARY

Aspects include a method for ray tracing, such as ray tracing of 2-D representations of 3-D scenes. The method comprises instantiating a plurality of rays to be tested for intersection with geometric objects comprising scene primitives and elements of geometry acceleration data. The method comprises associating respective clipping information with each of the plurality of rays indicative of a maximum distance from a respective origin that each associated ray is to be traced. The method also comprises testing each ray of the plurality for intersection only with geometric objects within its maximum distance as specified by the clipping information. The method also comprises outputting a respective indication of any closest identified intersection between each ray and any tested scene primitive.

Aspects also include a system for rendering 2-D representations of 3-D scenes using ray tracing, which comprises a first processing resource configured with computer readable instructions for a shader routine. The shader routine is associated with a geometric shape identified during intersection testing of a 3-D scene composed of a plurality of geometric shapes, and the instructions for the shader routine, when executed, operable to instantiate a data structure having ray definition data. The ray definition data comprises data defining a sub-portion of the 3-D scene in which intersection testing for the ray is to be confined. The system also comprises an intersection testing resource operable to receive the data structure, to test the ray for intersection with geometric shapes composing the 3-D scene that are within the sub-portion of the 3-D scene, and to provide an indication of a nearest intersection, if any, between the ray and a shape composing the scene.

Further aspects include a computing resource for performing intersection testing operations useful in rendering 2-D images from 3-D scenes using ray tracing. The computing resource also comprises one or more interfaces operable for obtaining data representative of a ray to be intersection tested in a 3-D scene, and ray-specific clipping information. The ray-specific clipping information, with an origin of the ray, defines an extent over which intersection testing for that ray is to be confined. The interfaces also are for obtaining data defining a shape to be tested for intersection with the ray.

The computing resource also comprises intersection test limiting circuitry configured for determining whether the shape is within the extent of the ray to be tested, based on the obtained clipping information; and intersection testing circuitry configured for testing a shape for intersection with the ray responsive to the limiting circuitry determining that the shape is within the extent, and for outputting indications of a detected intersection between the shape and the ray. The circuitry can comprise general purpose hardware programmed with software, customized, or partially customized hardware, as well as combinations thereof. The circuitry also can be distributed among plural physical locations, as desired for any given implementation.

Further aspects include a method for rendering 2-D representations of 3-D scenes using ray tracing, the method comprises instantiating a plurality of rays to be intersected tested in a 3-D scene composed of primitives. The method also comprises associating respective clipping data with each of the plurality of rays. The method also comprises, for each ray, traversing an organization of elements of geometry acceleration data that respectively bound increasingly smaller group of the primitives to arrive at a final group of primitives to test for each ray, the traversing including determining whether a given element is within a maximum test distance obtainable from the clipping data. The method further comprises testing each ray for intersection with its final group of primitives and reporting intersection testing results that include a closest detected intersection for each ray.

Further aspects comprise a method useful in rendering 2-D representations of 3-D scenes using ray tracing. The method comprises receiving an indication that a first ray intersected a first primitive of a plurality of primitives composing a 3-D scene, and causing instantiation of a second ray having an origin proximate the intersection of the first ray and the first primitive, and associating with the second ray a clipping distance and a default intersection object. The method further comprises determining that the second ray does not intersect any primitive composing the scene between the origin of the second ray and a point along a direction of the second ray within the clipping distance, and responsive to the determining, returning an indication that the second ray intersected the default intersection object.

Still further aspects include a method for use in ray-tracing based rendering of 2-D representations based on geometric shapes located in 3-D space and comprising primitives, and elements of geometry acceleration data, which respectively bound selections of the primitives. The method comprises causing instantiation of a ray defined in part by origin data and a ray-specific clip distance independent of a scene clip distance; and testing the ray for intersection only with geometric shapes closer to the origin of the ray than the ray-specific clip distance.

Still further aspects comprise a computer readable media storing computer readable instructions for implementing a method useful in shading detected intersections between rays and geometric shapes in ray-tracing based 3-D scene rendering. The method comprises defining with first ray definition data, in a first compute resource configured for intersection shading, a first ray to be tested for intersection in a 3-D scene composed of geometric shapes. The ray definition data comprises an origin of the first ray, one or more flags, and an identifier that uniquely identifies the first ray from other rays that may be concurrently tested for intersection.

The method comprises storing the first ray definition data in a first memory and providing the identifier for the first ray to a second compute resource configured for testing rays for intersection with geometric shapes. The method also comprises retrieving, to the second compute resource, the first ray definition data from the first memory, and testing the first ray with at least one geometric shape. The method also comprises, responsive to detecting an intersection of the first ray with any of the geometric shapes, using the one or more flags to determine content of an output from the second compute resource.

Still further aspects also include a computer readable media storing computer readable instructions for implementing a method useful in shading detected intersections between rays and geometric shapes in ray-tracing based 3-D scene rendering. The method comprises accepting an intersection test request from a shader routine that identifies a ray to be intersection tested in a 3-D scene. The method also comprises obtaining from the intersection test request information indicative of a sub-portion of the scene in which intersection testing is to be confined, identifying selections of primitives composing the scene, and determining whether such selections of primitives are within the sub-portion of the scene prior to arranging for intersection testing of them with the identified ray.

Still further aspects include a computer readable media storing computer readable instructions for a shader implementing a method. The method comprises defining a ray to be intersection tested in a 3-D scene, selecting a ray-specific clipping distance for the ray. The clipping distance is distinct from a global clipping distance defined for the 3-D scene. The ray-specific clipping distance is selected to confine intersection testing for the ray between an origin of the ray to its clipping distance. The method also comprises arranging intersection testing for the ray using its ray-specific clipping distance.

BRIEF DESCRIPTION OF THE DRAWINGS

The detailed description references the following figures.

DETAILED DESCRIPTION

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

For clarity in description, data for a certain type of object, e.g., a primitive (e.g., coordinates for three vertices of a triangle) is described simply as the object itself, rather than referring to the data for the object. For example, when referring to "instantiating a ray", it is to be understood that data representative of that ray is being produced, rather than a physical realization of that ray.

The following figures present examples of systems and portions thereof for rendering 2-D representations of 3-D scenes using ray tracing. Two principal components to such rendering are tracing rays to identify intersections and shading identified intersections. Generally, any of the functions or duties of any of the functional units may be implemented in multiple hardware units, or pieces of software, software subroutines, and may even be run on different computers. In some cases, such implementation is described more particularly, as it can bear on system function.

As introduced in the background, a 3-D scene needs to be converted into a 2-D representation for display on a 2-D screen. Such conversion can involve selecting a camera position, from which the scene is viewed. The camera position frequently represents a location of a viewer of the scene (e.g., a gamer, a person watching an animated film, origins for holographic image slices, and so on.) The 2-D representation is usually at a plane location between the camera and the scene, such that the 2-D representation comprises an array of pixels at a desired resolution. A color vector for each pixel is determined through rendering. During ray tracing, rays can be initially cast from the camera position to intersect the plane of the 2-D representation at a desired point, and then continue into the 3-D scene.

In some implementations here, a location at which a ray intersects the 2-D representation can be retained in a data structure associated with that ray. When an intersection for a camera ray is detected, further intersection testing must be done responsively to that intersection detection. For example, it must be determined what light hits that intersection point, which can include testing whether light sources are shadowed by another object. What needs to be done responsive to an intersection detection is at least partially determined by qualities of the surface of the shape intersected. For example, if a transparent material (e.g., glass) were intersected, then different rays may need to be emitted than if an opaque material were intersected. What happens when an intersection is detected is largely determined by computer code (which is conveniently referred to as a shader for that object), and other data associated with the object intersection.

Figure 1:
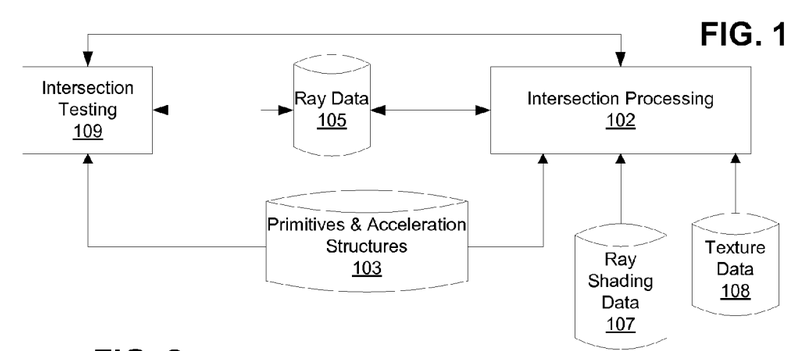
FIG. 1 illustrates a system architecture for ray tracing, which is an example of an architecture wherein presently disclosed subject matter may be used, which also can be applied in other system architectures for ray tracing.

FIG. 1 illustrates aspects of a system for use in ray tracing a scene composed of primitives. Any of the elements illustrated in FIG. 1 can be implemented as one or more distinct portions of hardware and/or software.

The depicted system comprises a geometry unit (not depicted), an intersection testing unit 109, an intersection processing unit 102, and a sample processing unit (not depicted), which can be implemented in hardware and/or software as appropriate. Each of the geometry unit, intersection testing unit 109, intersection processing unit 102, and the sample processing unit can also be embodied on a video card or other external or internal computer system peripheral. A link 118 provides communication between ray data 105 and intersection testing unit 109. Intersection testing unit 109 receives geometric shape data from primitive & GAD storage 103 by a link. In some cases, primitive & GAD storage 103 can be implemented in a main memory storing other data, such as sample data, ray shading data 107 (e.g., shader routines), and texture data 108, which can be separate from ray data storage 105.

In FIG. 1, embodiments implementing any of the described units at least partially in software, computer-executable instructions representing unit functionality can be stored on recordable-type computer-readable, such as, for example, magnetic or optical disks, flash memory, USB devices, etc. Other features of FIG. 1, such as the links can be implemented in a variety of ways depending on the nature of the units identified. For example, if intersection testing unit 109 comprises a plurality of threads executing on one or more CPUs, then the link between ray data 105 and intersection testing unit 109 can comprise physical memory access resources of such CPU(s) and appropriate memory controller hardware/firmware/software to provide access to ray data storage 105.

Intersection testing unit 109 includes one or more individual test resources (a.k.a. test cells), which can test a geometric shape against a ray. Each test cell can produces testing results, which can include indications whether a given ray has intersected a given primitive. Generally, system components are designed to support unknown time-to-completion of a given, specific, ray test. In sum, the Intersection Testing Unit 109 has read access to the geometry memory, and has a queue of references to rays as inputs. As an output of intersection testing, each ray can be associated with a piece of geometry that it intersected first.

Figure 2:
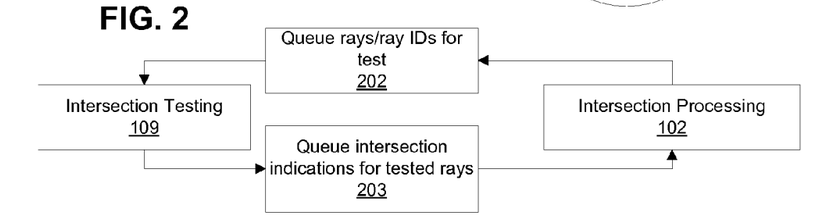
FIG. 2 illustrates how portions of the system of FIG. 1 may be coupled in some implementations.

FIG. 2 illustrates a higher level architecture involving the intersection processing resource 102 and the intersection testing resource 109 of FIG. 1. The intersection processing resource 102 and intersection testing resource 109 are coupled with a queue for rays/ray IDs to be sent from intersection processing 102 to intersection testing 109, and a queue 203 for sending indications of intersection testing results from intersection testing 109 to intersection processing 102. The queue 202 provides rays or ray identifiers that are instantiated by shaders running on intersection processing 102, while queue 203 provides indications comprising a ray identifier and a geometric shape first intersected (e.g., a primitive).

Figures 3A, 3B:
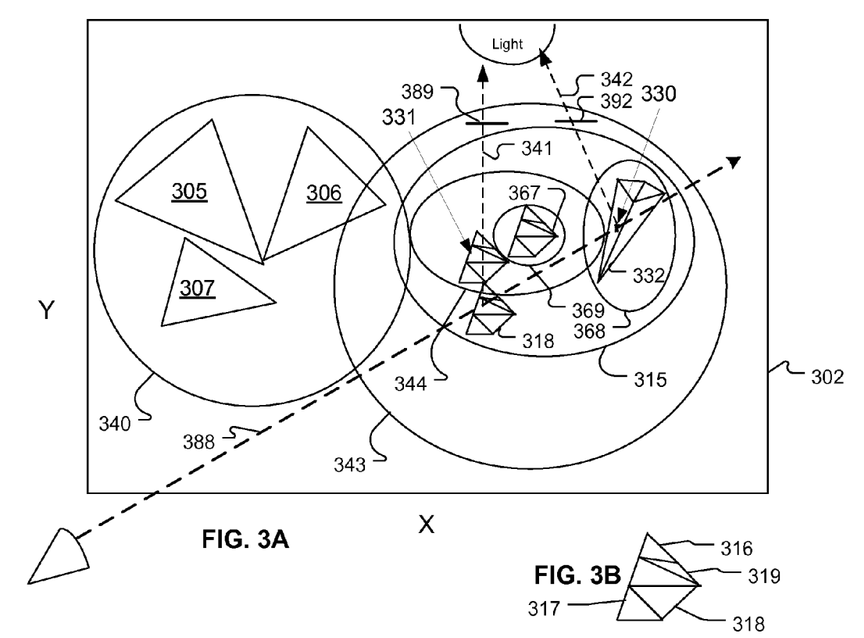
FIGS. 3A and 3B illustrate a scene with primitives and geometry acceleration data elements that is used to explain aspects of FIGS. 4-9.

FIG. 3A illustrates an example 2-D scene composed of triangular primitives (in some cases, strips of triangular primitives), and where selections of the triangular primitives are bounded by elements of geometry acceleration data (also referred to as 'GAD'). Although FIG. 3A is presented in 2-D for sake of clarity, the principles disclosed apply generally to 3-D scenes.

Because a scene can be composed of many (e.g., hundreds of thousands or millions, or more) of primitives, elements of GAD can be used to approximate boundaries for one or more primitives (or abstracting) in a scene to accelerate intersection testing by allowing groups of primitives to be identified for further testing (or excluded from further testing).

GAD elements generally include a geometric shape that encloses, in 3-D space, a respective collection of primitives, such that failure to intersect a surface of the geometric shape with a ray indicates that the ray also does not intersect any primitive bounded by the shape. GAD elements can comprise spheres, axis-aligned bounding boxes, kd-trees, octrees, and other sorts of bounding volume hierarchies. Since GAD elements primarily are useful in abstracting primitives for more quickly identifying intersections between rays and primitives, GAD elements preferably are shapes that can be easily tested for intersection with a ray.

In the example of FIG. 3A, for generality, generally spherical (circular in 2-D) GAD element 340 is shown to bound primitives 305, 306, and 307, while generally spherical element 343 bounds a group of other GAD elements described below, which in turn directly bound portions of primitives. Continuing, element 315 bounds a primitive 318 from a triangle strip, as well as GAD elements 344 and 368. GAD element 344 in turn bounds triangle strip 331 and GAD element 369, which in turn bounds triangle strip 367. GAD element 368 bounds triangle strip 332. In a sense, GAD element 343 bounds all of the primitives also bounded by intervening elements 344, 368, and so on. However, bounding generally herein refers to a direct bounding, without further intervening elements of GAD.

FIG. 3B illustrates other individual primitives of the triangle strip having primitive 318. Thus, FIG. 3B provides an example that the other triangle strips illustrated also could have separately enumerated primitives. The scene of FIG. 3A is intended as a generalized example in 2-D, and from it, it would be apparent that scenes of practical interest would be many orders of magnitude more complex.

Figure 4:
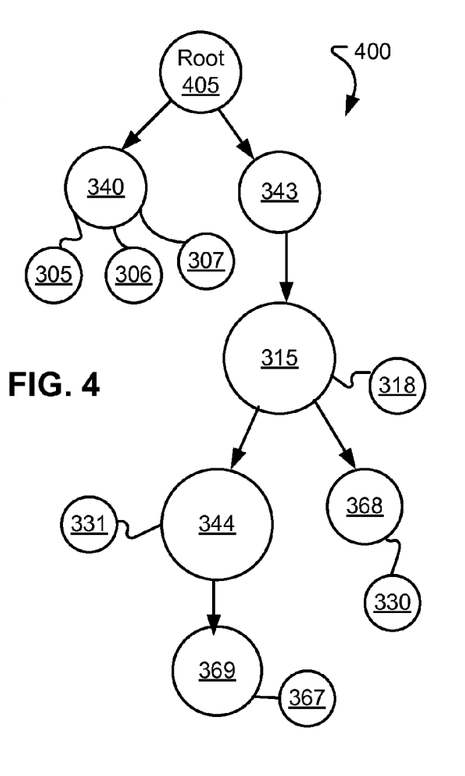
FIG. 4 illustrates an example organization of the acceleration data elements and primitives of FIG. 3A.

As alluded to above, GAD elements can be interrelated to each other. FIG. 4 illustrates such an interrelationship with the primitives and GAD elements of FIG. 3A with a graph 400 comprising nodes representing elements of GAD illustrated in FIG. 3A, and connected by edges to other GAD elements of FIG. 3A, and which ultimately bound primitives of FIG. 3A. In particular, a root node 405 that can impliedly bound an extent of the scene (i.e., it can be viewed as bounding all the primitives in the scene); as evident from FIG. 3A, root 405 need not be explicitly defined in the scene. Root 405 is connected by edges to GAD elements 340 and 343 (nodes). In turn, node 340 bounds primitives 305, 306, and 307. Returning to node 343, node 343 is connected to node 315, which is in turn connected to nodes 344 and 368. Primitive 318 is bounded directly by node 315 (i.e., GAD element 315), while strip 331 is bounded by node 344 and strip 330 is bounded by node 368. Node 344 bounds node 369 which bounds strip 367.

As can be graph 400 shows relationships among the GAD elements used to bound primitives of FIG. 3A, such that by starting at root 405, testing rays for intersection with GAD elements at different points in the graph allows narrowing of primitives that ultimately need to be tested for intersection with the ray or rays.

Thus, where a pair of elements is connected by an edge, the edge may indicate that one of the nodes has a different relative granularity than the other node, which can mean that one of the nodes connected by that edge bounds more or fewer primitives than the other node. In some cases, the graph can be hierarchical, such that there is a direction to the graph, and the graph can be traversed in order from parent nodes to child nodes, narrowing remaining bounded primitives along the way.

In some cases, the graph can have homogeneous GAD elements, such that if a given GAD element bounds other GAD elements (even though this graph is heterogeneous), the given GAD element also does not directly bound primitives (i.e., any primitives bounded by the given GAD element also would be bounded by one of the GAD elements bounded by the given primitive.) A graph of GAD elements can be constructed with a goal of maintaining some uniformity in a number of elements and/or primitives bounded by another GAD element. A given scene can be subdivided until such a goal can be achieved.

Rays usually are defined using an origin in 3-D space for the ray, and a direction vector. However, other mechanisms can be used to represent equivalent data for a ray, for example, various mathematical transforms can be used to map such origin and direction information into another set of variables.

In any event, even though a ray conceptually originates from a given origin, which may be anywhere in the scene for some kinds of rays, it is often preferable not to begin intersection testing starting from a ray's origin. For one thing, it may not be easily apparent, when using some acceleration structures, in what GAD element the origin is to be found.

Therefore, it is often the case that ray testing begins at a beginning (root) of an acceleration structure and proceeds into the structure. This means that a ray may be tested against primitives out of an order that the ray conceptually would traverse the scene from its origin. So, in the following description, it is provided that there is a mechanism to determine, based on a ray having been determined to intersect a given GAD element, what other GAD elements should be tested next in response. In an example of a hierarchical graph, then the elements tested next generally would be child nodes of a tested node. However, other suitable ways can be provided, for example, a graph can be directed, but not strictly hierarchical.

Figure 5:
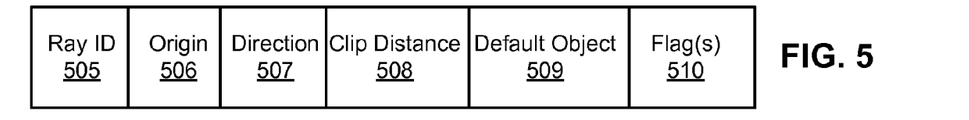
FIG. 5 illustrates a data structure for a ray having data for implementing methods and other aspects disclosed herein.

Now turning to FIG. 5, there is shown an example of a data structure 500 for defining a ray that includes a ray identifier (505) that can be used to identify/distinguish one ray from other rays currently being tested in the system. Data structure 500 also includes an origin 506, a direction 507, a clip distance 508, a default object 509 and one or more flags (510). More details concerning these components of data structure 500 are provided below.

Figure 6:
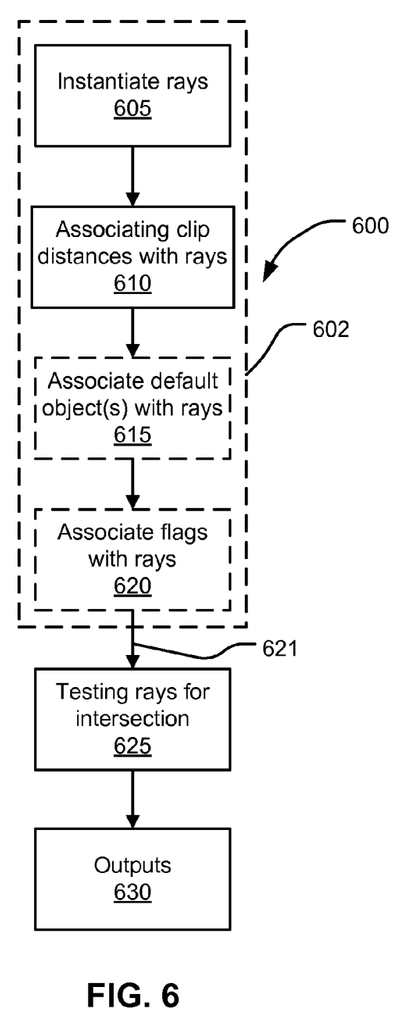
FIG. 6 illustrates steps of a method.
Figure 7:
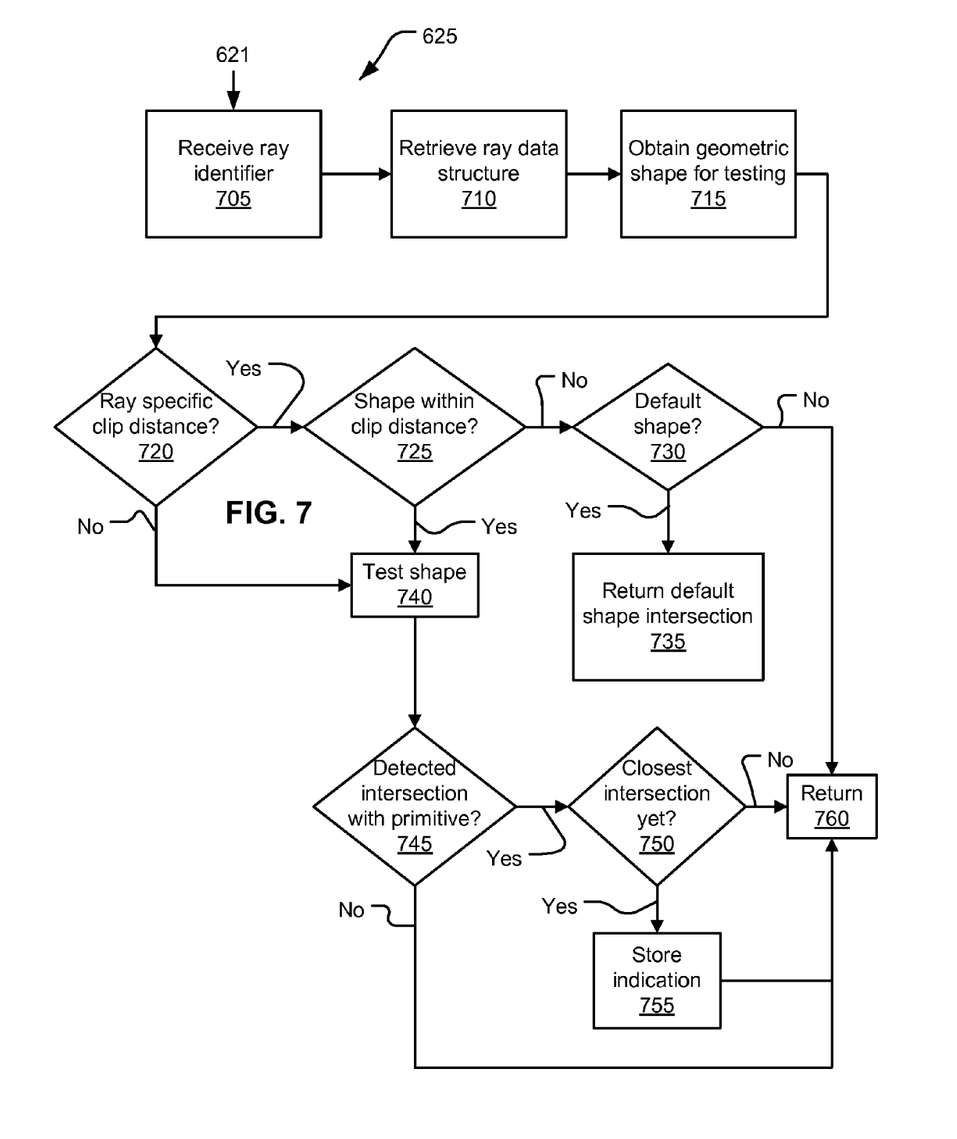
FIG. 7 illustrates steps of another method that can be used to implement a portion of the method of FIG. 6.
Figure 8:
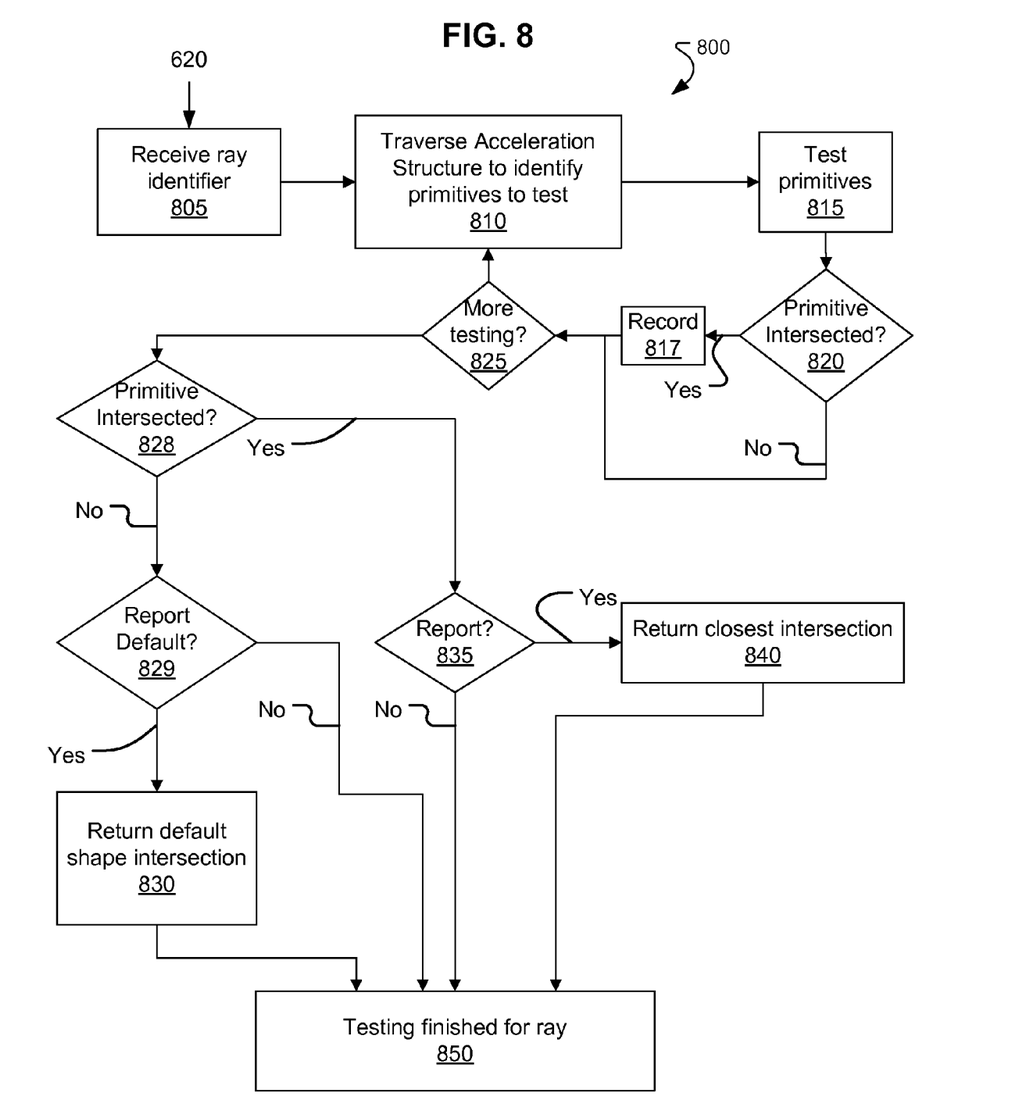
FIG. 8 illustrates steps of another method that also can implement aspects of FIG. 6.
Figure 9:
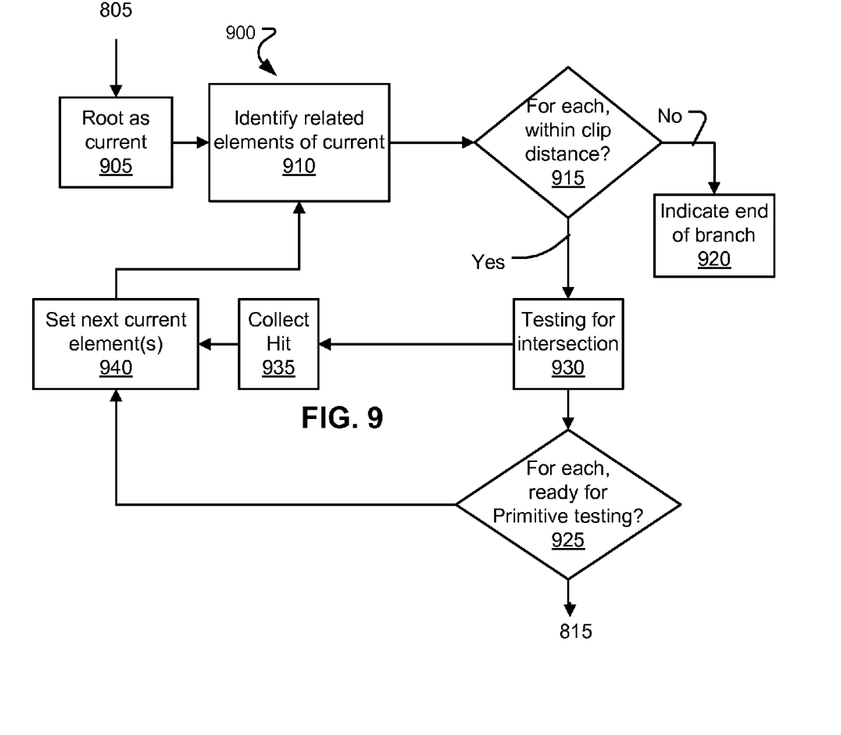
FIG. 9 illustrates steps of another method relating to traversing an organization of geometry acceleration elements according to aspects disclosed.

FIG. 6 illustrates a first method 600 relating to providing and using components of ray data structure 500, which can be performed by a shader (shading process, or the like) to produce inputs that can used in the methods shown in FIGS. 7-9. Also, method 600 can be performed responsively to receiving an indication of a ray/primitive intersection obtained from an intersection testing resource performing methods according to aspects disclosed in FIGS. 7-9 (i.e., there can be a loop between intersection testing and shading).

Method 600 includes a first step of instantiating 605 rays for intersection testing. Steps of method 600 that may be executed by shader code thus include instantiating rays 605, and associating 610 a respective clip distance with each ray (the shader can set a clip distance (610), or otherwise determines an extent or sub-portion of the scene in which the ray is to be tested).

The clip distance here is a clip distance for a given ray that is settable independently of a tracing limitation that can apply generally, such as for example, an extent of the entire scene. The clip distance can be specified in a variety of ways. One way is providing an end point in 3-D space (e.g., another 3 tuple specifying an end point). If a ray were specified parametrically, then a maximum parameter size may be specified. Other ways for such clip distance also can be provided, so long as it can be determined, for each ray having an associated clip distance, where intersection testing involving that ray should cease, or otherwise be confined.

Thus, ray data structure 500 defines a sub-portion of a scene in which intersection testing for the ray specified by that data structure is to be confined. When a ray is 2-D, such a sub-portion can be a line segment. For example, a line segment can be the sub-portion of the scene, defined by a ray origin and a second 3-D point in the scene. So, an intersection testing resource can interpret the data in the data structure to cause avoidance of intersection testing of geometric objects, such as acceleration elements and/or primitives, that are not within that scene sub-portion. For convenience, the term "clip distance" or "clipping distance" is used generally here, but it is to be understood that this terminology also refers to a more general concept of defining an extent or a subportion of a scene, and using that defined extent or subportion to discriminate as to whether a ray associated is to be tested only within or only without that extent or subportion.

In some cases, a data structure can contain information defining a plurality of rays. For example, in some situations, a shader may be programmed to test a number of points in a primitive for shadow by a light source. So, that shader may emit a number of rays having differing origins, but similar destinations. For example, a shader may parametrically define a number of rays, for example, to statistically sample a number of points (e.g., in Monte Carlo processes), and so in these situations, the data structure may contain parameters that can be used in defining a number of rays with differing origins but similar destinations. In these situations, the same default object could be provided for all the rays. In still other situations, the data structure can define a plurality of rays having a similar origin but different destinations. In these types of situations, a different default object could be provided for each different destination. These are merely examples of how different combinations of data to limit an extent of intersection testing for a ray in a 3-D scene can be implemented, as well as further extensions of providing one or more default objects that can be reported as intersected under different conditions.

It should be apparent from the usage of a separate clipping distance, or another way to limit an extent of testing for a given ray, that rays still can be defined that do not have a clipping distance and would be tested fully in the scene. So, in the context of systems and methods according to these examples and other aspects, there may be rays instantiated in the system that have respective clipping distances, and other rays that do not have any respective distance (other than a generalized scene clip distance, perhaps). Therefore, intersection testing implementations may provide functionality to determine which rays have a respective clip distance and which do not.

It also should be apparent that a distinct data structure embodying the portions of data structure 500 need not be provided in some implementations. Rather, any of the portions of data structure 500 can be provided by any suitable mechanism. For example, implementations may provide a utility (e.g., a procedure call, a function call, or the like) that allows a shader to request ray tracing of a specified ray only within a clip distance (more generally, a scene sub-portion). The utility can also be provided to accept other parameters from a shader, such as default objects and flags that are shown in data structure 500. Of course, such a utility could receive a reference, such as a memory location reference for a location of data structure 500 in a call from a shader instantiating such a utility. The utility also can be programmed to infer some of the data shown in data structure 500 from other data. For example, a shader can provide a default object identifier, and programming implementing the utility can infer a clip distance from the default object. The clip distance would be closer, and in some circumstances, slightly closer, to an origin of the ray to be tested than the default object.

Although a ray can have definition data separate from a clip distance, in some cases, a ray could be defined with a clip distance, by for example specifying two different points in space that define an origin and a maximum extent of testing along a line segment connecting the two points. Optionally (as indicated by dashed lines), the shader can specify a default shape (615) and set one or more flags (620). As described with respect to previous figures, the default shape can be returned by an intersection tester as having been intersected, if no primitive within the clip distance was intersected, and upon further interpretation of any flags set. The shader can determine to set a flag that will cause an intersection testing resource to report the default shape intersection only under certain circumstances, or to report anything other than the default shape intersection under other circumstances. Then, the shader can submit (identified as communication 621) the secondary ray (or any number of instantiated rays) for testing. In some examples, a ray can be associated with a clipping interval, where a ray be confined for testing either within or without that interval, which is specified as a subset of a normal extent of the ray.

FIG. 7 illustrates a method 700 implementing a component 625 of method 600 for intersection testing, which may be implemented by an intersection testing resource for testing rays in an implementation where rays can be associated with a respective clipping distance. In method 625, intersection testing can be triggered in an intersection testing resource by receiving a ray identifier 705. For example, an intersection testing resource may be coupled to a localized memory, wherein a number of data structures for rays (see FIG. 5) are stored, then, the intersection testing resource may be provided from another computing resource, an identifier for a ray stored in the localized memory, which indicates to the testing resource that data defining the identified ray should be retrieved (710) and the ray tested. The ray identifier can be accompanied by an identifier for a geometric shape, or data defining a geometric shape (715).

Method 625 continues with determining whether the ray is associated with a respective clip distance (720), and if so, then it is determined whether the shape to be tested is within such clip distance (725). If there is not a clip distance, or if the shape is within the clip distance, then the shape is tested (740). If the shape is without the clip distance, then it is determined whether there is a default shape for the ray (730), and if so, then the default shape can be returned as having been intersected by the ray (735). If there is no default shape, then the method 625 returns 760, without reporting an intersection, since the shape was outside the clip distance, and no default shape was defined. Other variations on these steps are possible, in that other features, such as flags can be provided, and so behavior can vary based on the presence of such other data. Also, in implementations where rays always have clip distances and/or default objects defined, then such determining steps can be excluded (e.g., such fields can be defined in such a way that they are interpreted as a non-limiting clip distance, or as a null shape, for example).

If the shape was tested (740), then it is determined whether there was an intersection detected with a primitive (745). In other words, method 625 is general to whether a given tested shape is a primitive or an acceleration element, but shaders generally do not need indications of intersections with acceleration elements, as these elements are only for accelerating an identification of an intersected primitive, so some way of distinguishing an intersection between these two shape types is provided.

Also, since most ray tracing implementations terminate a ray after a closest primitive intersection, only the closest detected intersection needs to be tracked in those implementations. So, 750 provides for determining whether a detected intersection is closer than any previously detected intersection. If so, then an indication of such intersection is stored (755); such indication can include an identifier for the primitive intersected and/or can be stored with the data structure defining the ray in the localized memory, transmitted to a shader, via intermediate processes, or the like. Then, if no intersection was detected (745), if a detected intersection was not closest, or after 755, method 625 returns 760.

Method 625 may be appropriate for an implementation where computing resources can be reconfigured for intersection testing of any of a variety of shapes, including shapes used for acceleration structure and for primitives. For example, spheres or bounding boxes may be used for acceleration structure and triangles for primitives. However, it usually is the case that some elements of an acceleration structure are traversed for a given ray until some selection of primitives are identified for test (e.g., in the case of a kd-tree, 3 axis subdivisions of 3-D space can continue until a volume of space contains a small enough volume or small enough number of primitives to test them.

Therefore, another example method 800 that illustrates a separate traversal of an acceleration structure is shown. Method 800 can be entered, for example, from step 620, and can begin with receiving a ray identifier 805 (see FIG. 7.) Method 800 also can include traversing 810 an acceleration structure to identify primitives to test, and then testing 815 the primitives for intersection (method 900, below, shows an example of traversal 810 in more detail.) Then, it is determined (820) whether a primitive was intersected, and if not, then it is determined whether more testing (825) is needed. If there was a primitive intersection, then the intersection is recorded (817) or at least checked to see if it is the closest yet detected intersection, and then checking of more testing needed (825) is performed.

More testing may be needed where a ray has not yet been traversed through an entirety of the acceleration structure. For example, in a kd-tree, each ultimate subdivision that bounds a selection of primitives will have other sibling nodes that need to be checked, and potentially there may be other parts of the kd-tree waiting to be traversed as well. So, before an ultimate intersection determination is reported (i.e., before intersection testing of the entire scene is complete), it needs to be determined whether there is to be an intersection test, or there is an intersection test for each primitive of the scene.

If testing is finished, then it can be determined whether there was a recorded primitive intersection (828), and if there was no primitive intersection, then there can be a determination as to whether to report a default shape intersection (829). This provision can include accounting for whether a default shape is specified, and also whether there is a flag (see FIG. 5) indicating whether an intersection with the default shape should be reported or not. If the determination indicates that the default shape should be returned as intersected, then such an indication can be returned (830), and if not, then intersection testing is finished (850) for that ray. If a primitive was intersected, then a determination as to whether to report the intersection (835) also can be made. For example, a flag can be provided in a data structure for the ray that indicates under what conditions to report an intersection. If an intersection is to be reported, then a closest intersection (generally, the only one tracked) is returned (840). Thereafter, or if no intersection is to be reported, then testing is finished (850). The flag based determinations of method 800 also can be provided in the method 625.

FIG. 9 illustrates a method 900 of traversal of an acceleration structure, like that of FIG. 4. These disclosures are exemplary, and many different types of acceleration structures exist to which the aspects disclosed with respect to these examples can be applied and otherwise adapted by those of ordinary skill in the art. Method 900 can begin after 805 from FIG. 8, and can start with a root node of an acceleration structure (even though the term "node" is used here, there is no implication that a pre-set graph is required, as these disclosures can apply to any acceleration structure). Instead, root refers to a starting point, and where the root bounds the scene, it can be implied that any ray intersects the root, and so a next step is to determine (910) what elements/nodes are next after the root node. For example, graph 400 shows root 405 connected by edges to nodes 340 and 343, and so step 910 would identify nodes 340 and 343 as nodes next to be tested from root 405. Then, for these next elements, it is determined (915) whether each is within a clip distance specified for the ray being tested, and for any that is not, that branch or path is ended (920). And for any that is, that element is tested (930) for intersection. If there is an intersection, it can then be determined (925) if that element bounds any primitive ready for testing, which can mean, for example that there is not another element of acceleration structure that also bounds that primitive. If there is a primitive for testing, then method 900 goes to 815 of FIG. 8. Method 900 also can include collecting (935) the intersection with the acceleration element tested (e.g., if that element also bounds, or only bounds, other acceleration elements). In other words, method 900 can support deferral of intersection testing in the acceleration structure. Then, next current elements to test are selected (940), which can include setting a tested element as a current element, and then the identifying of elements related to the current element (910) is performed again. With reference to FIGS. 3A and 4, for example, if a ray's clip distance allows testing against element 315, then primitive 318 would be tested (can also include a clipping test), and ultimately elements 344 and 368 would be selected as next nodes to which a clipping test would be applied.

Now that an overview of methods shown in FIGS. 6-9 have been described, an example relating more particularly to FIGS. 3A and 4 is described. A camera ray 388 enters scene 302. In FIG. 4, this is represented by having ray 388 at root 405. Then, ray 388 can be tested for intersection with acceleration elements 340 and 343 (with the clip distance implementations of methods from FIGS. 6-9), and in this example, the clip distance allows such testing, and there is no intersection with 340, but there is with 343. So, then ray 388 is next tested for intersection with element 315, which it is found to intersect. Then, the triangle strip having triangle 318 is determined to be bounded by element 315, is tested, and found to be intersected by ray 388. The intersection is reported and a shader associated with primitive 318 is called. It determines to test ray 341 in the scene, and sets clip distance 389. Ray 341 is again traversed through the scene, and ultimately is tested for intersection with primitives of strip 331 and found to intersect. So, the clip distance was not reached for ray 341. Note that here, element 369 or element 369 and strip 367 might be tested, depending on an implementation and an order of testing.

If there were no intersection with primitive 318 and instead ray 388 intersected strip 332 at 330, and a shader can instantiate ray 342 with clip distance 392. Traversal for ray 342 can occur again in an order of root 405, element 343, element 315, element 344 and elements 369 and 368. However, no intersection is found in this case, and clip distance 392 is reached. Since clip distance 392 is reached, intersected with the light need not be explicitly checked. Thus if ray 342 were a shadow ray, it would be assumed that the origin of ray 342 were not in shadow of the light. In some aspects, the light or a primitive thereof can be returned as a default object intersected.

Thus, setting a ray specific clip distance, or another way to specify a sub-portion of a scene to test a ray in allows a narrowing of scene space to be tested for having such clipping specified. An example situation where such a feature may be useful is in the context of testing whether a given point is in shadow of a point light source. This application may be particularly useful because a ray may be specified for testing such shadowing, but due to machine imprecision, the ray may be determined to miss the light, even though it didn't hit any other primitive (i.e., even though the intention was to determine shadow from a light source, it is determined that the intersection point is in shadow, even though it isn't.) So, by providing a clip distance close to a light, once a ray gets close, then it can be determined that there is no primitive shadowing an intersection point. Also, more aggressive use of such clip distances can be used as desired.

As described above, modules of code, provided for shading ray intersections, can emit secondary rays to accomplish various tests, such as occlusion tests, when shading intersections. In these examples, such ray emission can include setting a custom clip distance for one or more rays, and setting a default object to be intersected, or a group of default objects, for a group of rays, and so on. An Application Programming Interface (API) can be provided for use by such shaders, which can make it easier to use such clipping functionality. For example, a ray emission function call can accept a clip distance definition, and a default object identification. By further example, a ray emission function call can accept a definition for a bundle of rays to be emitted, each with different clip distances, or default objects (and can infer clip distances from the objects). For example, the API can maintain state, such as locations of lights in a scene, and shaders emitting shadow rays can let the API determine what default objects should be assigned to rays designated as shadow rays when they are emitted. The data provided by or through the API can then be used during intersection testing to control how intersection testing is conducted. The U.S. provisional application Nos. 61/099,152, 61/101,854, and 61/172,453, incorporated herein by reference, disclose various other API related aspects that can be used in conjunction with these disclosures, including systems and methods of providing such APIs that can also be used for providing an API for accessing ray-specific clipping functionality and options described herein.

Figure 10:
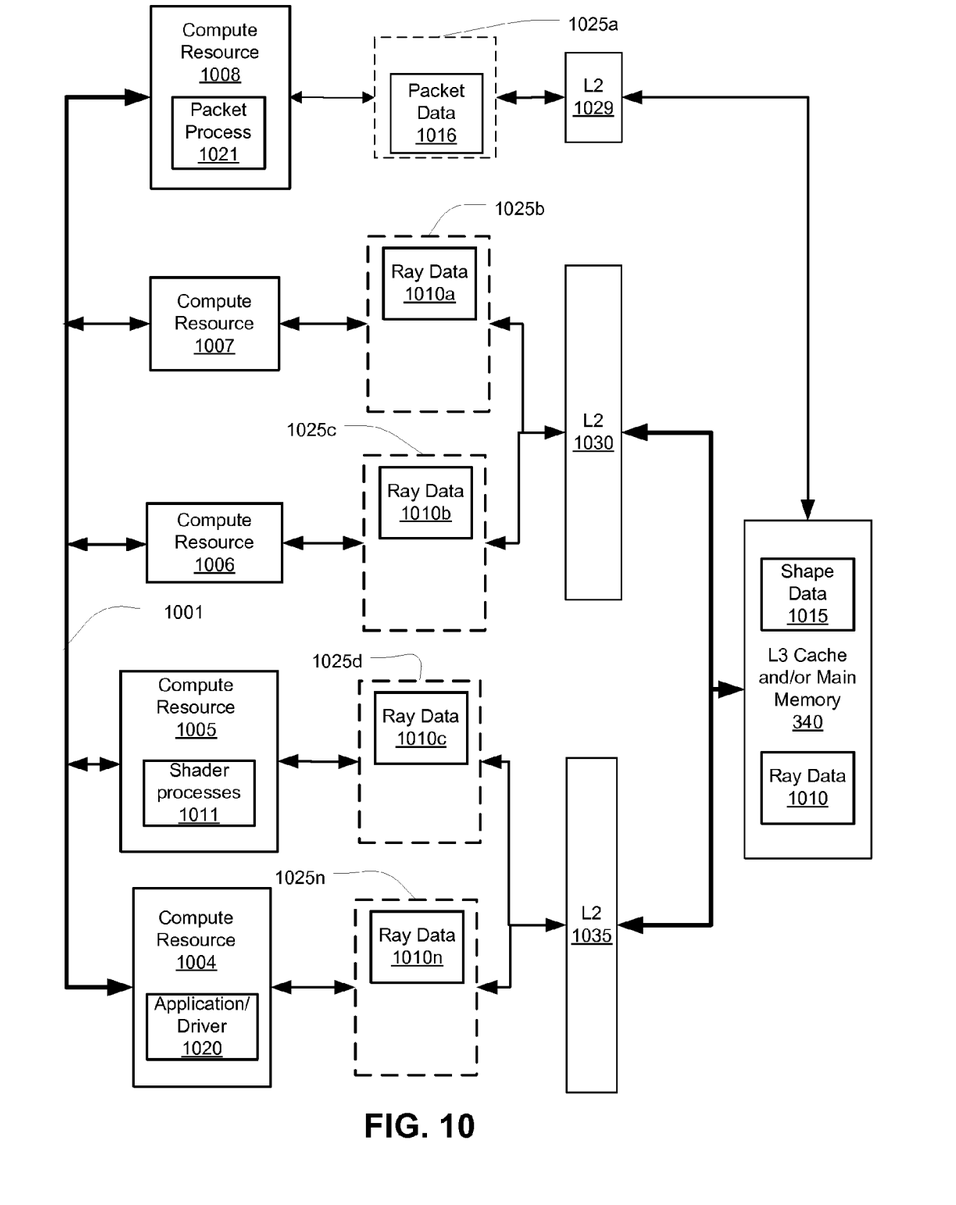
FIG. 10 illustrates aspects of an example system implementation involving multiple processing elements in which any aspects described above can be provided.

FIG. 10 shows a system example in which aspects described above can be employed, and which can be considered a more specific example of the system of FIG. 1. The depicted system includes a plurality of compute resources (1005-1008) that may be one or more of processes, threads, cores, distinct processors, graphics processors, application specific circuits, FPGAs, and the like. The depicted system may comprise a heterogeneous mixture of such different types of compute resources. For example compute resource 1004 can host an application needed ray tracing rendering services, and a driver to interface the application to other compute resources providing such services; because of its compute workload, compute resource 1004 may be better suited to be implemented as a general purpose processor. Likewise, compute resource 1005 shown as hosting shader processes 1011 may be better suited to be implemented with a compute resource with at least some general programming capability, although graphics hardware is becoming increasing able to execute more sophisticated shading algorithms with less control from general purpose processors. A communications link 1001 connects compute resources 1005-1008, and may include a mesh of point to point connections, one or more shared busses, memory mapped I/O and the like, or in the case of thread-to-thread or process-to-process communications, link 1001 may comprise any technique used to pass such information between those entities, and can rely on services provided by operating systems and other platform software that may be available in a particular implementation.

The compute resources 1004-1008 communicate with caches 1025a-1025n (shown generally in the concept that there may be a private or semi-private cache for each compute resource provided in the system of FIG. 10). Each such cache may store ray data 1010a-1010n also indicated. Each cache 1025a-1025n may be fed from secondary caches 1029, 1030, and 1035, that may be less numerous than caches 1025a-1025n, and which may be private or shared. In the example system of FIG. 10, L2 caches can be fed from L3 cache and/or main memory 340, which can store both shape data 1015 and ray data 1010.

In sum, any of the functions, features, and other logic described herein can be implemented with a variety of computing resources. A computing resource can be a thread, a core, a processor, a fixed function processing element, and the like. Also, other functions which are not primarily the focus of the present invention, can be provided or implemented as a process, thread or task that can be localized to one computing resource or distributed among a plurality of computing resources (e.g., a plurality of threads distributed among a plurality of physical compute resources).

Likewise, computing resources being used for intersection test can also host other processes, such as shading processes that are used to shade intersections detected. By further example, if a core can support multiple threads, then a thread can be dedicated to shading while another thread can be dedicated to intersection processing.

Code for any method can be stored in computer readable media, such as solid-state drives, hard drives, CD-ROMs and other optical storage means, and in volatile and non-volatile memories such as SRAM and DRAM technology memories.

Computer-executable instructions comprise, for example, instructions and data which cause or otherwise configure a general purpose computer, special purpose computer, or special purpose processing device to perform a certain function or group of functions. The code can be used in programming modules of FPGAs, or used in determining layout of ASICs. The computer executable instructions may be, for example, binaries, intermediate format instructions such as assembly language, or source code.

We claim:

1. A method for ray tracing 2-D representations of 3-D scenes, comprising:

instantiating, in a processor executing a shader routine, a ray to be tested for intersection with geometric objects comprising scene primitives and elements of geometry acceleration data, the instantiating comprising providing a data structure storing data defining an origin and direction for the ray and respective clipping information indicative of a maximum distance from the origin that the ray is to be traced and storing the data structure in a tangible machine readable medium prior to initiating intersection testing of the ray; and in an intersection tester, accessing the data structure from the tangible machine readable medium to obtain the origin and direction for the ray, testing the ray for intersection only with geometric objects within the respective maximum distance defined by the clipping information stored in the data structure for the ray, and outputting an indication of any closest identified intersection between the ray and any tested scene primitive.

2. The method of claim 1, further comprising in the processor executing the ray shader, storing data in the data structure for the ray that defines an association between a default geometric object and the ray , and in the absence of a detected intersection between any scene primitive and the ray within the maximum distance for the ray defined by the clipping information stored in the data structure for the ray, processing the rays as though the ray intersected the one or more default geometric objects to which the ray is associated.

3. The method of claim 2, wherein the one or more default geometric objects include a global default object.

4. The method of claim 3, wherein the global default object can be substituted, per ray, for respective ray-specific default objects.

5. The method of claim 2, wherein the one or more default objects include one or more of a light, a portion of a light, and a primitive that has light emissive properties.

6. The method of claim 2, further comprising performing the associating by associating respective identifiers for each of the one or more default geometric objects with respective rays of a plurality of rays to which those objects are associated.

7. The method of claim 1, wherein the respective clipping information for each ray includes information indicative of a location in 3-D space that, with the origin information for that ray, can be used to derive a line segment definition.

8. The method of claim 1, further comprising associating a flag with the ray, the flag for indicating that an indication for the ray is to be outputted only for an intersection with an object other than a default object for the ray.

9. The method of claim 1, further comprising associating a flag with the ray, the flag for indicating to output an indication when the default object is intersected by that ray, which is found to intersect no other object.

10. The method of claim 1, further comprising associating a set of one or more flags with the ray, the flag set for the ray indicating treatment of the ray during intersection testing by the intersection tester.

11. The method of claim 1, further comprising associating a set of one or more flags with the ray, the flag set for the ray indicating content of the indication for use by a shading resource for output by the intersection tester.

12. The method of claim 1, further comprising storing a set of flags indicating how data stored in the ray data structure is to be interpreted.

13. The method of claim 1, wherein the intersection tester comprises any of one or more of threads executing on a multithreaded CPU, physically separate cores packaged together, multiple physically distinct processing resources coupled for interprocessor communication, and fixed-function test cells.

14. The method of claim 1, wherein the clipping information in the data structure further comprises information indicative of a minimum distance from the origin that the ray is to begin to be traced.

15. A system for ray tracing, comprising:
a first processor configured with computer readable instructions for a shader routine associated with a geometric shape identified during intersection testing of a 3-D scene composed of a plurality of geometric shapes, the instructions for the shader routine, when executed, operable to instantiate a data structure having ray definition data for a ray to be tested for intersection in the 3-D scene, the ray definition data comprising data defining a sub-portion of the 3-D scene in which intersection testing for the ray is to be confined, wherein the sub-portion is less than a maximum extent of the 3-D scene, and to store the data structure in a tangible machine readable medium prior to initiating intersection testing of the ray; and
an intersection testing resource operable to receive the data structure, to access the data defining the sub-portion of the 3-D scene from the data structure, to test the ray for intersection with geometric shapes composing the 3-D scene that are within the sub-portion of the 3-D scene, to exclude from testing a geometric shape that is not within the sub-portion of the 3-D scene, and to provide an indication of a nearest intersection, if any, between the ray and a shape composing the scene.

16. The system of claim 15, wherein the data structure further comprises data defining the sub-portion as a line segment beginning at a ray origin and extending to another point in the 3-D scene.

17. The system of claim 15, wherein the instructions, when executed, are further operable to provide in the data structure, data defining a default geometric shape, and the intersection testing resource is further operable to provide to the shader routine an indication that the default geometric object was intersected, if no other geometric object was determined to be intersected within the sub-portion of the 3-D scene.

18. The system of claim 15, wherein portions of the geometric shapes composing the scene are bounded by elements of an acceleration structure, and the first processing resource is further configured with instructions to test each ray only with elements of the acceleration structure within the sub-portion of the 3-D scene.

19. The system of claim 18, wherein the sub-portion is defined between a first point and a second point defined in the 3-D scene.

20. A method of ray tracing, comprising:
causing instantiation of a ray having an origin determined based on an intersection point of another ray and a primitive composing a 3-D scene;
associating with the ray a clipping distance that is less than an extent of the 3-D scene and a default intersection object;
determining that the ray does not intersect any primitive composing the scene between the origin of the ray and a point along a direction of the ray within the clipping distance; and
responsive to the determining, returning an indication that the ray intersected the default intersection object.

21. The method of claim 20, wherein the determining further comprises using elements of a hierarchical acceleration structure that each bound selections of the plurality of primitives to determine whether any primitives bounded by a given element are within the clipping distance, and if not then causing an intersection testing resource to avoid further intersection testing either of primitives or of other elements bounded by that element.

22. The method of claim 21, wherein the one or more elements of the hierarchical acceleration structure include one or more of spheres, axis-aligned bounded boxes, and kd-trees.

23. The method of claim 20, wherein the default intersection object is a light source in the scene, and the ray is for determining whether the intersection point is occluded from receiving light from the light source.

* * * * *